United States Patent
Park

(10) Patent No.: US 6,359,567 B1
(45) Date of Patent: Mar. 19, 2002

(54) ADAPTER AUTOMATICALLY CONTROLLING POWER SUPPLY FOR AIR CONDITIONING APPARATUS BY SENSOR

(76) Inventor: Tai-Up Park, 1044-3, Soha 2-Dong, Gwangmyung-Si, Kyunggi-Do (KR)

( * ) Notice: Subject to any disclaimer, the term of this patent is extended or adjusted under 35 U.S.C. 154(b) by 0 days.

(21) Appl. No.: 09/599,838

(22) Filed: Jun. 23, 2000

(30) Foreign Application Priority Data

Apr. 29, 2000 (KR) .......................................... 00-23170

(51) Int. Cl.7 .............................................. G08B 17/10
(52) U.S. Cl. ........................ 340/632; 340/585; 62/129; 62/132; 454/75
(58) Field of Search ................................ 340/632, 585; 62/125, 126, 129, 132; 454/75

(56) References Cited

U.S. PATENT DOCUMENTS

| | | | | |
|---|---|---|---|---|
| 4,217,646 A | * | 8/1980 | Caltagirone et al. | 700/296 |
| 4,437,391 A | * | 3/1984 | Eguchi et al. | 454/75 |
| 4,829,779 A | * | 5/1989 | Munson et al. | 62/175 |
| 5,001,905 A | * | 3/1991 | Miyazaki | 62/244 |
| 5,743,101 A | * | 4/1998 | Shida et al. | 62/175 |
| 6,076,365 A | * | 6/2000 | Benatav | 62/160 |

* cited by examiner

*Primary Examiner*—Edward Lefkowitz

(57) ABSTRACT

An adapter automatically controlling a power supply for an air conditioning apparatus by a sensor and individually formed outside of a power supply unit and an air conditioning apparatus, including a single or plural output terminals switching with an input power plug by a gas detecting control circuit installed in the adapter; a composite gas sensor operating the gas detecting control circuit; and a detection reference value preset volume controlling an operating range of this composite gas sensor.

3 Claims, 3 Drawing Sheets

Figure 1:
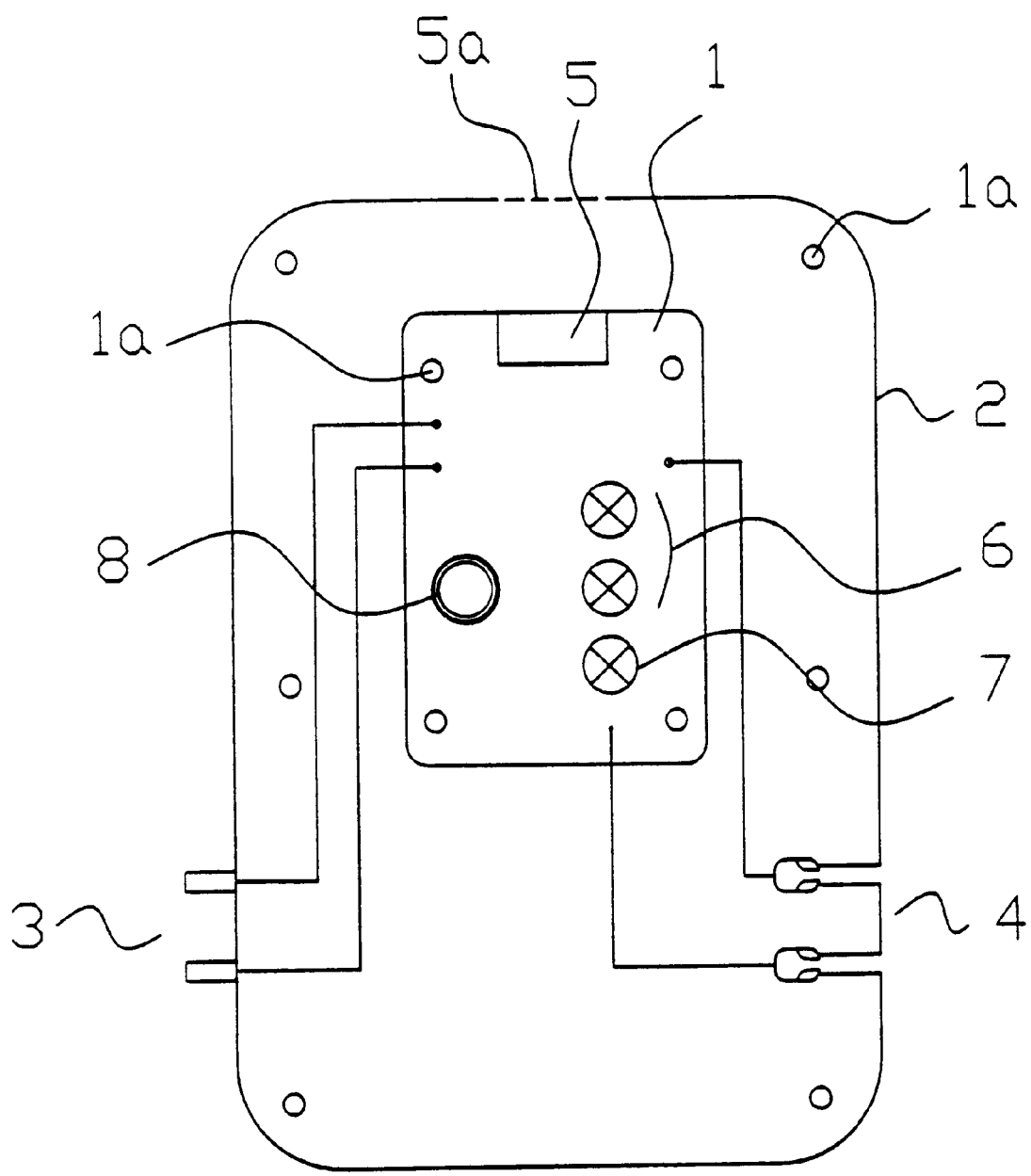

ADAPTER AUTOMATICALLY CONTROLLING POWER SUPPLY FOR AIR CONDITIONING APPARATUS BY SENSOR

BACKGROUND OF THE INVENTION

1. Field of the Invention

The present invention relates to an adapter automatically controlling power supply for an air conditioning apparatus by a sensor.

2. Discussion of Related Art

When various gases other than fresh air are produced and accumulated in a closed space, rapid ventilation is required for preservation of health and safety, or the origin of gas generation should be removed and combustion reaction must be stopped. The present invention encompasses an adapter-type power supply unit which automatically applies power to a ventilating device, an air exhauster, a breaker, a combustion control device, an air supply device, etc. just when a harmful gas is filled in a space to a given level. The present invention is an automatically controlled artificial intelligence (AI) power supply auxiliary device receiving an output from a sensor and turning on and off the ventilating device and breaker. The invention integrally consists of a power supply unit, a gas pollution detector and a driving output controller to maximize the performance connective features and efficiency. The inventive device of simple structure and small size contributes to energy saving and maintenance of pleasant environment, and prevents various accidents that may occur due to noxious gases. In addition, the present invention may decrease the production costs and is simply applicable to conventional equipment as well as to new ones.

The present invention concerns an applied power supply control device, and may be applied to various ventilating devices, air exhausters, breakers, combustion control devices, air supply devices, etc. Conventional ventilating devices and the like do not have manual ON/Off switches without power supply automatic controllers. Since such devices have been continuously driven for a long period of time even if ventilation is not necessary because there is no smell, they increase power consumption and energy spending due to the drop of indoor temperatures, and ventilation fans may be reduced in life and generate much noises. In addition, there are frequent occasions when the ventilating fans already installed are not used for the reason of power saving or prevention of noise, thereby causing large-scale accidents.

According to another conventional ventilating device using a sensor, the features of the sensor are not fully displayed, and the sensor, a controller and a driving unit are separated from each other to make it difficult to install and maintain the conventional one. Since the conventional ventilating device includes unnecessary functions (timer, delay, display, etc.) and lots of circuits, and is large in bulk and expensive, it is not being widely used.

SUMMARY OF THE INVENTION

Accordingly, the present invention is directed to an artificial intelligence power supply controlling adapter for rapidly applying power to an apparatus for making shift measures such as breakers, etc. when harmful gases are greatly generated to require ventilation or when gas leakage or incomplete combustion occurs when using a ventilating device, an exhausting device, various breakers, etc. The inventive artificial power supply controlling adapter includes a function of sensing an amount of harmful gas, a function of controlling turning on and off the power, and a function of applying the power, electrically and mechanically joined to each other and integrally formed on a single small board, thus controlling power input and output.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides an adapter automatically controlling a power supply for an air conditioning apparatus by a sensor and individually formed outside of a power supply unit and an air conditioning apparatus. The adapter includes a single or plural output terminals switching with an input power plug by a gas detecting control circuit installed in the adapter; a composite gas sensor operating the gas detecting control circuit; and a detection reference value preset volume controlling an operating range of this composite gas sensor. According to another aspect of the present invention, an adapter automatically controlling a power supply for an air conditioning apparatus by a sensor includes an input power plug; a plurality of output terminals; a circuit board having a gas detecting control circuit driving a relay; a composite gas sensor provided to the edge of the circuit board; air contact window holes each formed to a small size; a detecting reference value preset volume; and a buzzer and a light emitting diode. The input power plug applies a power to a detecting control board through an internal line, and the detecting control board is connected to the output terminal through the internal line.

According to another aspect of the present invention an adapter automatically controlling a power supply for an air conditioning apparatus by a sensor includes a detection reference value preset volume allowing a preset value of a harmful gas density to be controlled from the outside; and a plurality of output terminals receiving a power from a relay of a detecting control board for a single input power supply to permit a power application and information transfer to a ventilating fan, a breaker, and various control display devices.

The gas detecting control circuit includes a power supply circuit receiving an alternating current voltage through an internal line to drive a metal oxide semiconductor composite gas sensor, and supplying a heater voltage and a circuit voltage 10V as direct currents; a detecting circuit detecting a resistance variation of harmful gases with the size of voltages; an amplifying circuit controlling a weak detecting signal to a size required for driving a relay or a light emitting diode; a compensating circuit compensating a change in the resistance of the semiconductor gas sensor with an outer temperature; a switching control circuit turning on or off an output signal on the basis of a preset density; and an output circuit driving the light emitting diode, a buzzer, and the relay, and producing a power to a terminal through an internal line.

It is to be understood that both the foregoing general description and the following detailed description are exemplary and explanatory and are intended to provide further explanation of the invention as claimed.

BRIEF DESCRIPTION OF THE ATTACHED DRAWINGS

Figure 2:
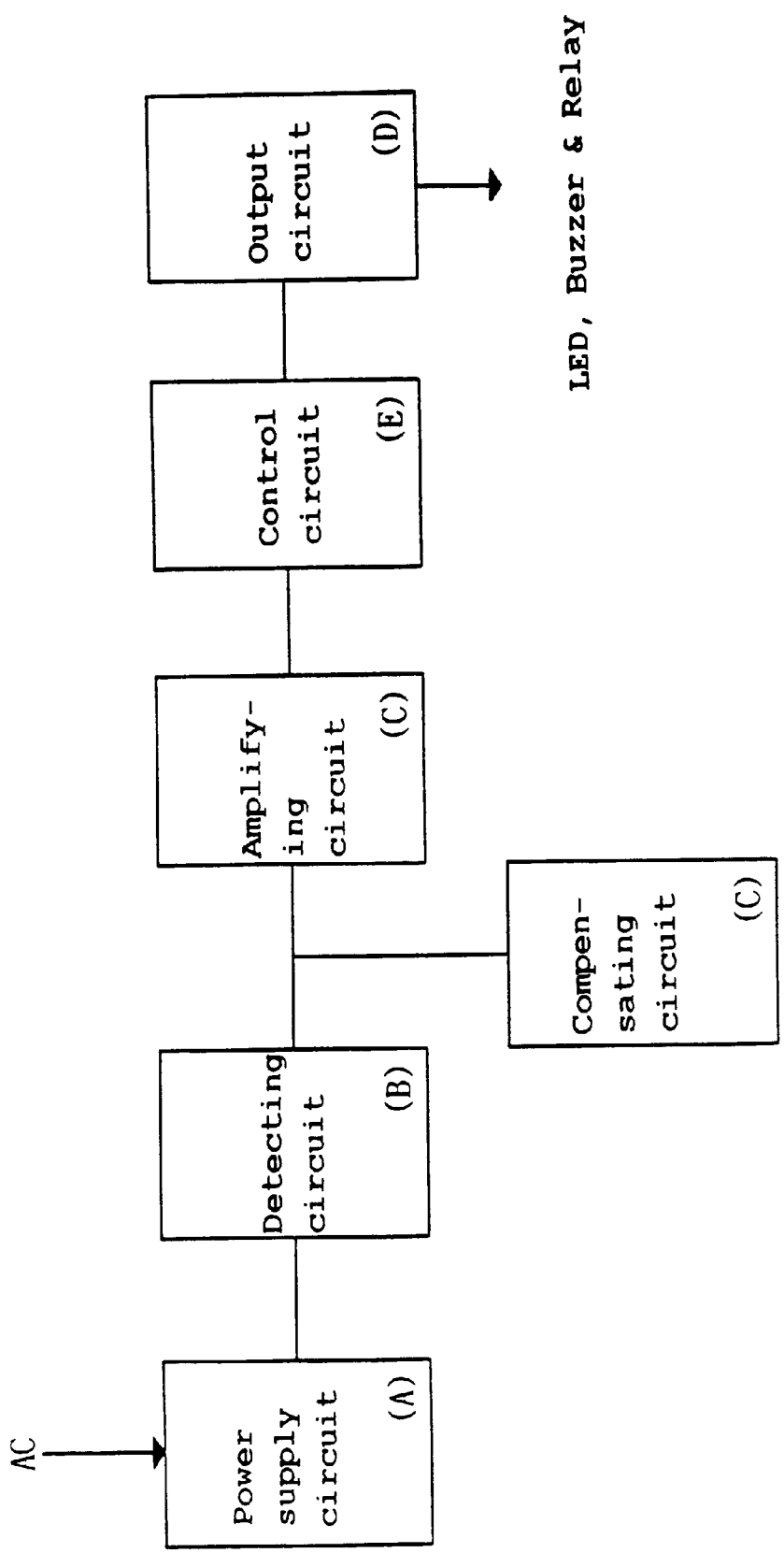
Figure 3:
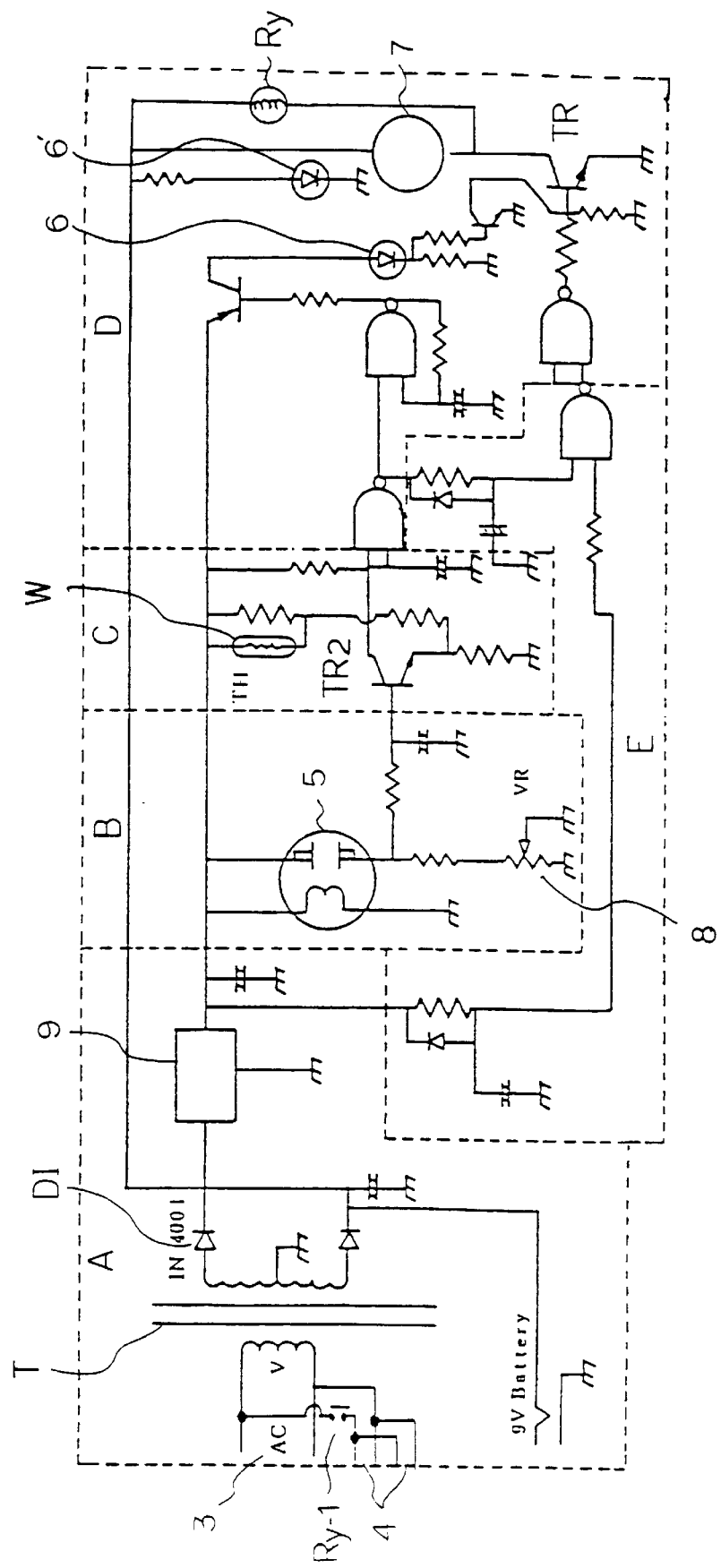

The accompanying drawings, which are included to provide a further understanding of the invention and are incorporated in and constitute a part of this specification, illustrate embodiments of the invention and together with the description serve to explain the principles of the drawings:

In the drawings:

FIG. 1 schematically depicts an adapter in which an adapter is installed in accordance with the present invention;

FIG. 2 is a block diagram of a detecting control circuit board installed in the inventive adapter; and FIG. 3 is an overall circuit diagram of the present invention.

DETAILED DESCRIPTION OF PREFERRED EMBODIMENT

Reference will now be made in detail to the preferred embodiments of the present invention, examples of which are illustrated in the accompanying drawings.

The present invention relates to an adapter individually formed outside of a power supply unit and an air conditioning apparatus, and includes a single or plural output terminals switching with an input power plug by a gas detecting control circuit installed in the adapter, a composite gas sensor operating the gas detecting control circuit, and a detection reference value preset volume controlling the operating range of this composite gas sensor. The AI power supply adapter of the present invention is designed as shown in FIG. 1.

A single gas detecting control circuit board 1 and an adapter body 2 are formed as a support body. This adapter body 2 has an input power plug 3 and a plurality of output terminals 4 like a common-type consent at both ends, and the gas detecting control circuit board 1 is fixed to the middle of the adapter body 2.

The gas detecting control circuit board 1 includes a conventional semiconductor composite gas sensor 5 detecting pollution or a harmful gas (if the gas density is higher than a reference value, there is a change in output voltage), a power supply circuit A, a detecting circuit B, and an amplifying circuit C, a compensating circuit C', a switching control circuit E and an output circuit D.

As shown in FIG. 2, each circuit's function is briefly described. The power supply circuit A receives a voltage of 100 to 200V through an input internal line and drives a metal oxide semiconductor composite gas sensor, and supplies a heater voltage of 8 to 15V, and a circuit voltage of 5 to 10V as direct currents. The sensor detecting circuit detects a resistance variation of 10 kinds of harmful gases with the size of voltage (0 to 10V), and the amplifying circuit C controls a weak detecting signal to a size required for driving a motor, a light emitting diode, or a buzzer. The compensating circuit compensates a change in the resistance of the semiconductor gas sensor with outer temperature. The switching control circuit turns on or off an output signal on the basis of preset density of about 10 ppm, and the output circuit produces a voltage to a terminal through an internal line.

Contact window holes 5a are formed on the adapter body's top portion so that a harmful gas is freely input and output. The gas detecting control circuit board 1 is secured to the body 2 via pieces 1a.

Blue and red light emitting diodes (LEDs) 6 are provided to the front surface of the adapter, and the blue LED 6 is turned on at normality while the red LED 6 is turned on when harmful gases are detected and exhausted. A buzzer 7 for alarming when harmful gases are excessively filled in a space, is also provided to the front surface of the adapter.

The detection reference value preset volume 8 is rotatably provided thereto to control a harmful gas exhaust preset reference value according to a user's discretion. In FIG. 3, a node Ry-1 of a relay Ry for outputting power is connected to an input power supply of 220V. This relay is connected or disconnected thereto in response to the size of a signal from the gas detecting control circuit. A plurality of such terminals for outputting 220V can be made for a ventilating fan, a breaker, etc. The gas detecting control circuit includes a driving transistor receiving a control output signal, the LED 6, the buzzer 7, and the relay Ry. These three electrical components are turned on or off in response to the size of the control output signal. Reference symbols Q, T, W, 6', and $TR_2$ denote a constant voltage regulator, a transformer, a temperature compensating thermistor, power LED, and an amplifying transistor, respectively.

PREFERRED EMBODIMENTS

A case where the inventive adapter is installed in a rest room is described by way of an example. The inventive adapter is used instead of a conventional ventilating fan's plug in the rest room. The plug of the ventilating fan is inserted into the adapter's output terminal. At this point, the blue LED is turned on to show the normal operation. If nasty gases (CO, $NH_3$, $SO_3$, $CH_4$, etc.) of at least 10 ppm are produced, the semiconductor composite gas sensor senses it through the gas detecting control circuit, and sends an electrical signal to the amplifying circuit C. The sensor determines if the signal compensated in outer temperature by the compensating circuit C' is higher than a preset reference. When the signal is higher than the preset reference, the sensor actuates the switching control circuit to turn on and output the power for driving the ventilating fan. Accordingly, the red LED gives light by this output circuit D, and the buzzer may produce a sound, if necessary. Once the density of any harmful gas is below 10 ppm in the rest room after a given period of time elapses and the air in the rest room is purified, the power is not applied to the ventilating fan any more. That is, the sensor's output signal becomes low to turn off the power to the switching control circuit.

The operation of the electrical circuit according to the present invention is described as follows.

(1) Power supply circuit

The power applied through a plug of 220V generates alternating current (AC) power via the transformer T, and this AC power is converted to a direct current (DC) power by the constant voltage regulator Q and applied to the sensor and the overall circuits.

(2) Detecting circuit

If the DC power is applied to the composite gas sensor 5's heater and sensing part, the heater produces heat of 300 to 500° C., and in the sensing part the resistance of 30 to 150 kohm is changed by the input gas. A variable resistor VR, the reference value preset volume 8, controls the density of the gas detection.

(3) Amplifying and compensating circuits

The amplifying transistor amplifies the signal, varied with the gas density in the detecting circuit, to a given amplitude, and the amplification degree is controlled by the temperature compensating thermistor W according to a variation in outer temperature.

(4) Control and output circuits

After comparing the output signal from the amplifying and compensating circuits with the output signal produced at the time of applying the power in amplitude, if an output signal higher than the preset reference value is produced, the control and output circuits transmits a turn-on signal to the driving circuit if an output higher than the preset reference value is produced, and sends a turn-off signal to the driving circuit if an output lower than the preset reference value is generated.

(5) Driving circuit

The output signal from the control circuit actuates the LED, the buzzer, and the relay by the switching transistor. The driven relay's node applies power to the ventilating fan's consent or breaker's consent.

The inventive adapter can be employed in the following places by using the semiconductor composite gas sensor simultaneously detecting and distinguishing various gases from one another.

| Places | Main Gas | Maximum Permissible Limit | Symptoms |
|---|---|---|---|
| Office/Lounge | Co, $CO_2$, Nicotine, etc. | 10 (ppm) | Nervous/Mental Disorder |
| Rest room | $NH_3$, $SO_3$, $CH_4$, CO, etc. | 10 | " |
| Kitchen | CO, $NH_3$, $CH_4$, etc. | 10 | " |
| Boiler chamber | CO, NOx, $SO_3$, $CH_4$, etc. | 10 | Nervous Disorder-Death |
| Factory/Working place | VOC, CO, $NH_3$, $H_2S$, $CH_4$, Cl, etc. | 10 | " |
| Underground Parking lot | CO, NOx, $SO_3$, Rn | 10 | Pulmonary disease |
| Green house | CO, $SO_3$, $CH_4$, $NH_3$, $CO_2$ | 10 | " |

The present invention uses an up-to-date metal oxide semiconductor composite gas sensor to enhance the technical application, and has integral functions of a sensor, a controller and a power supply unit to be easily installed and maintained. Since the inventive adapter, excluding unnecessary functions (timer, delay, display, etc.) and circuits, is small in volume and inexpensive, it can be of practical use all over the world.

The present invention can be simply applied to all presently available air exhausters, ventilating devices, breakers, etc. without any additional equipment. Thus, the present invention has an advantageous economical aspect, and can avoid great power consumption due to long-time use of ventilating devices even though there is no bad smell or harmful gas in a place, great energy consumption due to the drop of indoor temperature, reduction in the life of ventilating devices, generation of noises, etc. Therefore, it can be expected that the present invention is effective in saving energy and making a pleasant living environment. In addition, the inventive adapter-type power supply unit is used to sense a leakage of gas for heating or cooking at homes, and when noxious gases leak out at factories, and poison gases are excessively exhausted or a fuel gas is escaped from a boiler, the present invention can actuate the breaker simply and rapidly, simultaneously with ventilating, thereby preventing accidents that may occur.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An adapter automatically controlling a power supply for an air conditioning apparatus by a sensor and individually formed outside of a power supply unit and an air conditioning apparatus, said adapter comprising:

a single or plural output terminals switching with an input power plug by a gas detecting control circuit installed in the adapter;

a composite gas sensor operating the gas detecting control circuit; and a detection reference value preset volume for controlling an operating range of said composite gas sensor.

2. An adapter automatically controlling a power supply for an air conditioning apparatus by a sensor comprising:

an input power plug;

a plurality of output terminals;

a circuit board having a gas detecting control circuit driving a relay;

a composite gas sensor provided to the edge of the circuit board;

air contact window holes each formed to a small size;

a detecting reference value preset volume; and a buzzer and a light emitting diode; said input power plug applying a power to a detecting control board through an internal line, and said detecting control board connected to the output terminal through the internal line.

3. An adapter according to claim 1, wherein the gas detecting control circuit includes a power supply circuit receiving an alternating current voltage through an internal line to drive a metal oxide semiconductor composite gas sensor, and supplying a heater voltage and a circuit voltage 10V as direct currents;

a detecting circuit detecting a resistance variation of harmful gases with the size of voltages;

an amplifying circuit controlling a weak detecting signal to a size required for driving a relay or a light emitting diode;

a compensating circuit compensating a change in the resistance of the semiconductor gas sensor with an outer temperature;

a switching control circuit turning on or off an output signal on the basis of a preset density; and an output circuit driving the light emitting diode, a buzzer, and the relay, and producing a power to a terminal through an internal line.

* * * * *